US 9,756,168 B1

(12) United States Patent
Rao et al.

(10) Patent No.: US 9,756,168 B1
(45) Date of Patent: Sep. 5, 2017

(54) MULTIFUNCTION MOBILE DEVICES AND APPLIANCE CONTROL

(76) Inventors: Sanjay K Rao, Palo Alto, CA (US);
Sunil K. Rao, Palo Alto, CA (US);
Raman K. Rao, Palo Alto, CA (US)

( * ) Notice: Subject to any disclaimer, the term of this patent is extended or adjusted under 35 U.S.C. 154(b) by 940 days.

(21) Appl. No.: 10/911,211

(22) Filed: Oct. 13, 2004

Related U.S. Application Data

(62) Division of application No. 09/591,381, filed on Jun. 9, 2000, now Pat. No. 7,929,950.

(51) Int. Cl.
| | |
|---|---|
| *H04W 4/00* | (2009.01) |
| *H04M 1/725* | (2006.01) |
| *H04M 11/00* | (2006.01) |
| *G08C 17/02* | (2006.01) |
| *H04L 12/28* | (2006.01) |

(52) U.S. Cl.
CPC ........ *H04M 1/72533* (2013.01); *G08C 17/02* (2013.01); *H04L 12/2803* (2013.01); *H04M 11/007* (2013.01)

(58) Field of Classification Search
CPC ............. H04M 1/72533; H04M 1/725; H04M 1/6041; H04M 1/6058; H04M 2250/74; H04M 11/007; G08C 17/02; H04L 12/2803; H04L 29/08567
USPC ........... 370/335, 351, 352; 379/58; 455/434, 455/437, 420, 555, 553, 461; 709/221; 710/104
See application file for complete search history.

(56) References Cited

U.S. PATENT DOCUMENTS

| | | | | |
|---|---|---|---|---|
| 5,671,267 | A | * | 9/1997 | August ............. H04M 1/72502 379/102.03 |
| 5,764,730 | A | * | 6/1998 | Rabe et al. .................... 455/403 |
| 5,903,832 | A | * | 5/1999 | Seppanen et al. ......... 455/435.3 |
| 6,112,088 | A | * | 8/2000 | Haartsen ........................ 455/437 |
| 6,119,186 | A | * | 9/2000 | Watts et al. ..................... 710/104 |
| 6,167,464 | A | * | 12/2000 | Kretschmann ................... 710/15 |
| 6,223,029 | B1 | * | 4/2001 | Stenman et al. .............. 455/420 |
| 6,308,083 | B2 | * | 10/2001 | King .......................... 455/556.1 |
| 6,341,304 | B1 | * | 1/2002 | Engbersen et al. ........... 709/203 |
| 6,356,543 | B2 | * | 3/2002 | Hall et al. ...................... 370/352 |
| 6,401,059 | B1 | * | 6/2002 | Shen et al. ...................... 703/27 |
| 6,421,429 | B1 | | 7/2002 | Merritt et al. |
| 6,453,127 | B2 | * | 9/2002 | Wood et al. ...................... 399/8 |

(Continued)

OTHER PUBLICATIONS

Lawrence Harte, Morris Hoenig, Daniel McLaughlin, and Roman K. Kta. CDMA IS-95 for Cellular and PCS: Technology, Economics and Services. McGraw-Hill. 1999.*

(Continued)

*Primary Examiner* — Ajit Patel

(57) ABSTRACT

A wireless communication and control system including a wireless device. There is a central server for storing communication protocols and control protocols and communicating the communication protocols and selectively communicating the control protocols between the wireless device and the central server. A communication protocol configures the system for communication and control protocols configure the system as one of a selection of intelligent appliance controllers. Alternately the control protocols configure the system as one of a selection of Internet terminals. The wireless device is any hand-held communication device, such as a hand-held computing device, wireless telephone, or cellular phone.

34 Claims, 5 Drawing Sheets

(56) References Cited

U.S. PATENT DOCUMENTS

| | | | | |
|---|---|---|---|---|
| 6,493,751 | B1* | 12/2002 | Tate et al. | 709/221 |
| 6,529,491 | B1* | 3/2003 | Chang et al. | 370/335 |
| 6,539,237 | B1* | 3/2003 | Sayers et al. | 455/555 |
| 6,546,002 | B1* | 4/2003 | Kim | 370/351 |
| 6,591,103 | B1* | 7/2003 | Dunn et al. | 455/436 |
| 6,625,451 | B1* | 9/2003 | La Medica et al. | 455/434 |
| 6,628,964 | B1* | 9/2003 | Bates et al. | 455/556.1 |
| 6,826,405 | B2 | 11/2004 | Doviak et al. | |
| 6,832,230 | B1* | 12/2004 | Zilliacus et al. | 455/414.3 |
| 6,853,851 | B1* | 2/2005 | Rautiola et al. | 455/553.1 |
| 6,937,972 | B1* | 8/2005 | Van Ee | 703/20 |
| 6,993,359 | B1* | 1/2006 | Nelakanti et al. | 455/554.1 |
| 7,213,061 | B1* | 5/2007 | Hite | H04L 12/2803 |
| | | | | 361/803 |
| 7,286,658 | B1 | 10/2007 | Henderson | |
| 7,639,157 | B1* | 12/2009 | Whitley | G08C 17/02 |
| | | | | 340/870.02 |
| 7,894,474 | B1* | 2/2011 | Bell | 370/466 |
| 8,670,405 | B1* | 3/2014 | Lee et al. | 370/331 |
| 2002/0046083 | A1* | 4/2002 | Ondeck | 705/14 |

OTHER PUBLICATIONS

GB 2294563 published1/5/1196.*

* cited by examiner

700

| Frequency Source | Parameter |
|---|---|
| Channel 1 | f1, P1, BW1 --- |
| Channel 2 | f2, P2, BW2 --- |
| Channel N | fN, PN, BWN --- |

702

| Frequency Source | Parameter |
|---|---|
| Channel 1 | f3, P3, BW3 --- |
| Channel 2 | f4, P4, BW4 --- |
| Channel N | fM, PM, BWM --- |

MULTIFUNCTION MOBILE DEVICES AND APPLIANCE CONTROL

CROSS REFERENCE TO RELATED APPLICATIONS

The present application is a divisional of U.S. application Ser. No. 09/591,381 filed Jun. 9 2000 (now U.S. Pat. No. 7,929,950).

BACKGROUND OF THE INVENTION

Wireless devices are made to operate at a single set frequency to transmit and receive on a narrow frequency band. The ability to transmit/receive (T/R) and the protocols for executing the T/R function are primarily set in the hardware and are physically set for each mobile device (MD). Some mobile devices (MD) include the ability to reconfigure the MD for different environments and applications in cases where it is required that the phone be able to operate in these other environments and applications.

There is often a proliferation of mobile devices that must be carried by a user. For example, a user may need a device or remote for the public airwaves (cell phone), another for the local or office network and yet another for the home network such as wireless telephones, as well as controllers for TVs and other intelligent appliances. The present art offers limited Internet access and pager functions on some cell phones. Merely offering Internet access and pager functions is not a solution to the problem involved, such as relieving the proliferation of devices.

There is a need for a method to bypass the public wireless carrier, such as cell phones, for wireless telephones for local office or home networks where the public carrier services are not being utilized, without changing devices. This avoids the proliferation of devices mentioned before.

SUMMARY OF THE INVENTION

It is an object of the present invention to provide a wireless communication and control system including a universal wireless device. There is a central server for storing communication protocols and control protocols. The central server communicates the communication protocols and selectively communicates the control protocols between the wireless device and the central server. The communication protocols configure the system for communication and the control protocols configure the system as one of an arbitrary number of intelligent appliance controllers. Alternately the control protocols configure the system as one of a selection of Internet terminals. The wireless device may be, for example, a hand-held computing device, wireless telephone, or cellular phone.

Other objects, features and advantages of the present invention will become apparent from the following detailed description when taken in conjunction with the accompanying drawings.

BRIEF DESCRIPTION OF THE DRAWING

The accompanying drawings, being incorporated in and forming a part of this specification, illustrate embodiments of the invention and, together with the description, serve to explain the principles of the present invention:

FIG. 7 is an embodiment with tables illustrating the dynamic reconfiguration of frequency, power, and bandwidth.

DESCRIPTION OF THE PREFERRED EMBODIMENTS

Figure 1:
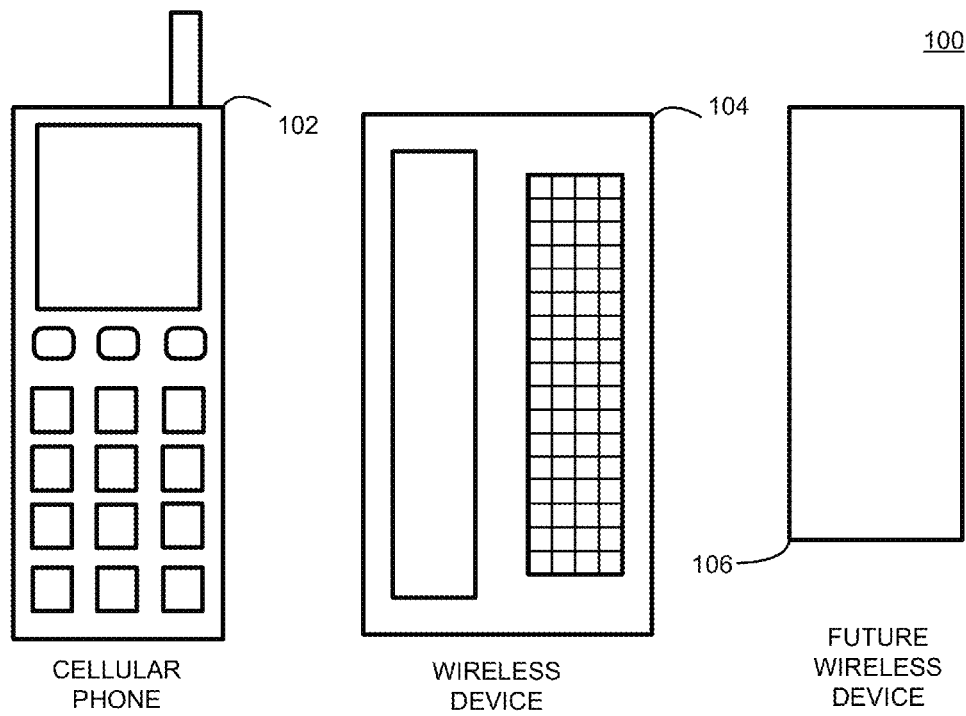
FIG. 1 is an embodiment illustrating different wireless devices.

Reference will now be made in detail to preferred embodiments of the invention, with examples illustrated in the accompanying drawings. The invention is described in conjunction with the preferred embodiments, however, it will be understood that the preferred embodiments are not intended to limit the invention. The invention is intended to cover alternatives, modifications and equivalents included, now or later, within the scope of the present invention as defined by the appended claims.

In the present invention, a cell phone acts as a radio, TV and pager to receive and transmit at different frequencies. In addition it is set to bypass the public wireless carrier for local office or home networks where the public carrier services are not required for communication.

The mobile device is dynamically software reconfigurable for the various environments. An example is such as the public networks in one or more countries, which may operate at different frequencies. Another example is found in the office, such as at one or more office locations operating at different frequencies, or in the home. It is desirable that the MD be dynamically tuned for transmit and receive functions suitable for each environment. For example, current wireless conditions may be determined by sensing the signal to noise ratio and the bit error rate. These parameters are a part of an error detection, error correction (EDEC) system in an embodiment of the system of the present The allowed power/channel bandwidth for a given environment or operating mode will be determined, for example, from a table in Server C. This would allow a phone in the USA to work on GSM, as an example. In the present invention a phone or other wireless device can be a remote TV controller, garage controller, or similar intelligent appliance. It can be a cordless phone.

The system of the present invention, including a wireless device forming a part of the system can work with, for example, GPS, or with public wireless location systems, to improve locating capabilities. For instance, since both the home and office network units/boxes are at known locations, tuning a CT/MD for operation as a GPS receiver, or other locating system, to the network units/boxes would give a precise location with respect to the home or office units/boxes. There are two possible locations for only two stations. Normally, therefore, three stations are required, but in many cases, for a CT/MD, one of the two locations is known to be invalid. For example, the location is known well enough to automatically rule out one location. In this case, the location will be precisely known from only the office and home network boxes, or from these units/boxes with respect to a public wireless station, or with respect to a satellite, or both. This software based configuration of (or configuration software for) the CT/MD (282 shown in FIG. 2A) is available from the network, such as from a server C located on the Internet that enables dynamic reconfiguration anywhere in the world for a CT/MD.

The MD is able to sense which environment it is primarily operating in at a given moment while maintaining the ability to switch instantaneously to a different environment. It has the ability to be in a watchdog or sleep mode (286 shown in FIG. 2A) in different environments while very active in a given environment at a particular time. This allows the MD to be very useful in one or more environments as the use dictates.

The same MD can be a part of the wired network and one or more wireless networks obviating the need for multiple devices. The MD operates in the IP mode (Internet Protocol) in the wired or wireless domains. The invention also deals with either wired or wireless network control/management units such as a multichannel, multiplexing transmit/receive (T/R) device—referred to also as a network unit or box—when they exist in each environment.

The present invention deals with any wired or wireless network box as a dynamically configurable device utilizing the power of the Internet and a central server C working alone or in tandem with other servers where ever they are located, and local or Internet based network boxes. This is illustrated using a cellular telephone but is fully extendable to all mobile devices.

FIG. 1 illustrates embodiments of a cellular telephone (CT) and a mobile device (MD). In FIG. 1, CT 102 is representative of the type of phone useful for the improved uses of the present invention. It will be clear to those of ordinary skill in the art that physical changes to the CT are not required. MD 104 is representative of the type of MD useful for the improved uses of the present invention, and as with the CT does not require physical changes. Wireless device (WD) 106 represents another embodiment of the CT and/or MD, and also will require no physical changes to implement the improvements of the present invention.

Figure 2A:
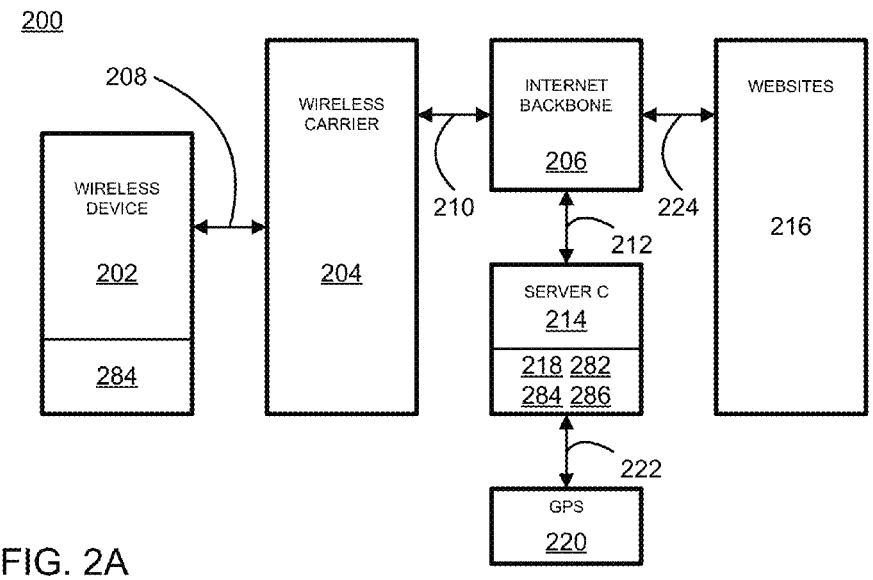
FIGS. 2A-2C show variations of comprehensive wireless networking schemes.

FIG. 2A is an illustration of an embodiment of a communication and control system 200. In FIG. 2A:

Cellular telephone or mobile device (CT/MD) 202 working in a domain 200 is highlighted in FIG. 2. In this embodiment the primary mode is through a public carrier 208.

The cellular phone (CT) 202 can initiate wireless IP connection 204 to the Internet 206 via the public carrier 202 at a set frequency, Fp 208, designated by the carrier and tuned for T/R for that particular carrier's FCC approved frequency band of operation. The carrier senses the T/R and makes either wired or wireless connections 210 to the Internet via an Internet backbone connection 212 to a desired Server C 214 or any web site 216 as defined by a URL request 224 of the CT/MD 202.

When a CT/MD 202 wishes to use the services of Server C 214, the Server C 214 delivers the content or performs functions as requested by the CT/MD 202.

A CT/MD 202 can store profiles and other user specific information on the Server C 214.

Server C 214 can be used to keep the various "functional instruction sets" (FIS) and software (S/W) 218 for use by the CT/MD 202. The FIS and software 218 resident on Server C 214 will serve to provide the primary repository/exchange to deliver various mode reconfiguration requests to the CT/MD 202. For example, the CT/MD 202 may send a request to the Server C 214 for configuration as a cell phone because it is not in the home environment. In this mode the CT/MD 202 may still receive inputs/outputs from to the local office loop network box or the home network box via the public carrier channel 208.

The ability to sense and switch from one mode to the other may include linking 222 to a Global Positioning System (GPS) 220 that determines the exact location of the CT/MD 202. Thus the CT/MD 202 may sense (or the appropriate network box at the office or home may sense) the location of the network box or the net to bring the CT/MD 202 into any local or carrier loop 208.

The CT/MD 202 in conjunction with the Server C 218 can decide the preferred mode to be in. There may be a primary mode and several secondary modes or a hierarchy of modes. The primary mode may switch from local office FIG. 2B to a public carrier loop 208, followed by a home loop FIG. 2C. This switching may be automatic or per specific functional instruction sets 218 and preferences stored on the Server C 214 or in the CT/MD 202 itself.

Figure 2B:
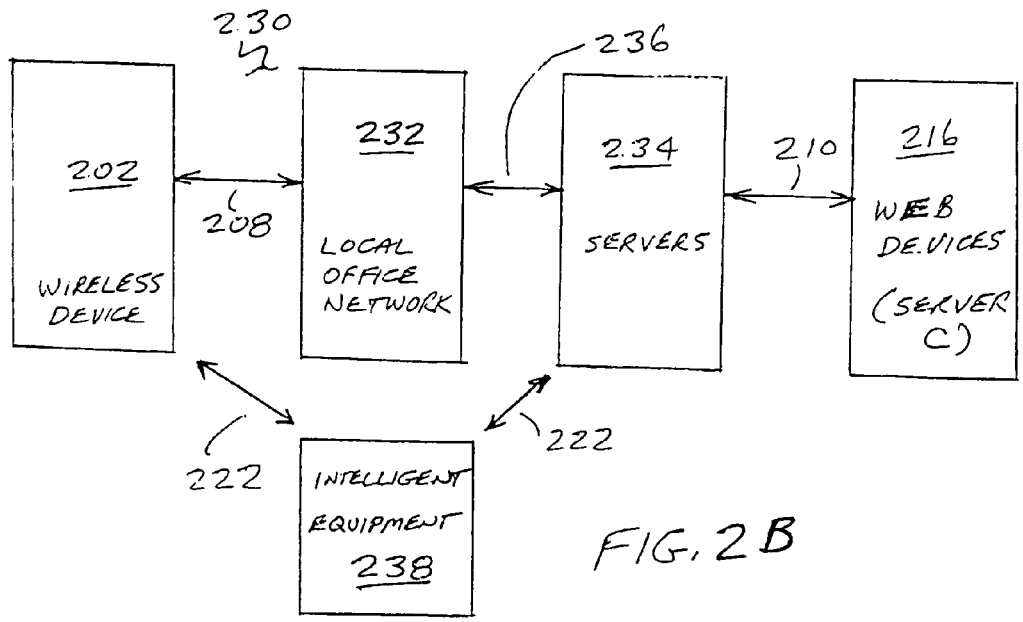

FIG. 2B is an illustration of an embodiment of a Local Office Loop 230 in accordance with the present invention. In FIG. 2B, a local wireless office IP network 232, which could also be a local area network (LAN) or other connectivity means, communicates with local servers 234. Servers 234 then connect on an as-needed basis with, for example, the world wide web (WWW).

The same CT/MD 202 can function in the local office loop 230 under the supervision of a local office wireless network switch or box 232.

The local office 230 can operate at the same or a different frequency for T/R. It is preferable for the local network box 232 and loop 230 to be at different frequencies that are geared toward a smaller area of influence. In that way the local network box 232 and loop 230 do not interfere with, for example, a public carrier frequency domain. The local network box 232 and loop 230 will be under the control of the local office—such as an office building or office campus.

The local wireless network switch or box 232 may operate at one or more frequencies. In this way, one of more channels will be devoted to a public carrier frequency 210 for T/R and one or more channels 208 will be devoted for T/R optimized for localized use in the campus or office building.

The CT/MD 202 when in the local office loop 236 can switch itself for optimal performance in the local office loop 230 by downloading/uploading FSI 218 and/or protocols in tandem with Server C 214.

Thus the CT/MD 202 can serve as a cordless phone in the local environment for interoffice phone calls or local area network 236 access working in tandem with a local network box 232.

In a similar fashion as described above, the CT/MD 202 also serves as a remote controller 270 for controlling intelligent office appliances 238 such as copiers and faxes.

Figure 2C:
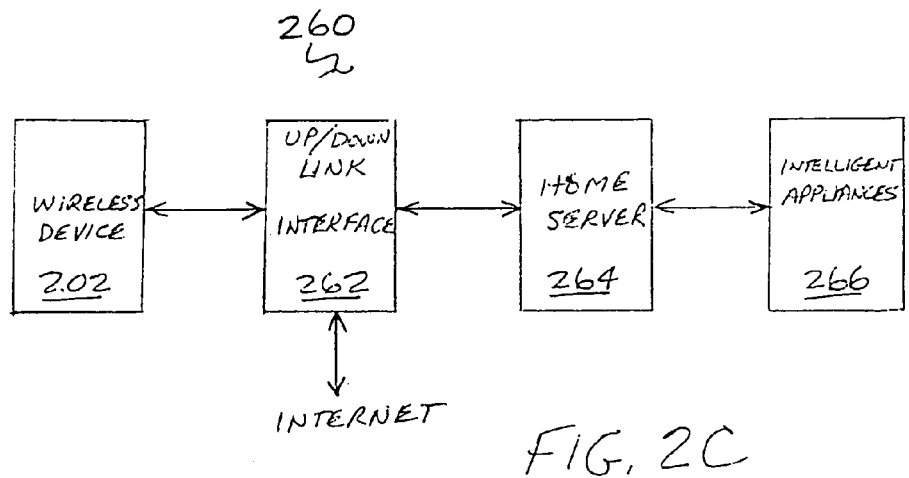

FIG. 2C illustrates a CT/MD 202 in the home loop 260. In FIG. 2C, the CT/MD 202 communicates through an optional uplink/downlink such as a transmit/receive unit 262 to home server 264. Home server 264 controls Home Intelligent Appliances (HIAP) 266. In this way, the CT/MD 202 can be a TV remote 272, remote access 274 for an oven or microwave for starting/stopping an operation at a desired time, or perform other household duties.

The same CT/MD 202 will function in the local home loop 260 under the supervisory control of a home network box 262 able to T/R in a specific home frequency band.

The home wireless network box 262 operates at same or different frequency of T/R as a public carrier 210. However, it is desirable to have different frequency of T/R optimized for home area wireless networks.

The local home wireless network box 262 may operate at one or more public carrier frequencies 210 and one or more local home wireless network box frequencies 268.

The CT/MD 202 when in the home wireless network mode may switch itself for this task for optimal performance by downloading/uploading FIS 218 (function instruction software) and/or protocols in tandem with Server C 214.

The CT/MD 202 may serve as a cordless phone (connected or hooked into a landed telephone line as an example, and operating as a telephone or as an IP phone) in the home wireless network loop 260 because it is now configured by the FIS 218. Also, the CT/MD 202 may be emulated by a cordless phone, such as by being configured with the FIS 218, allowing the functions of the CT/MD 202 to be performed without wasting air time. When the CT/MD 202 is being emulated by a cordless telephone, the cordless telephone base station may also be emulated by, for example, home server 264, such as by inserting a memory card to reconfigure the home server 264. One CT/MD 202, even when being emulated by, for example, a cordless phone, serves many purposes as opposed to requiring many telephone hand sets (one for the home, one for the office, and one for the car, as an example). Paging from one phone to the other in the wireless home network may be done very easily. All you need to carry is your CT/MD 202, real or emulated, which doubles as a regular telephone hand set.

In a similar fashion as described above, the CT/MD 202 may serve as a remote controller for various IP based intelligent wireless or wired home appliances 266. The TV may be controlled using the cell phone if the TV set is capable of receiving wireless commands. Opening the garage door may be done with a macro command 284 downloaded from the Central Server C 214.

Any set of "macro commands" and or detailed FIS 218 may be written for specific wireless intelligent appliances 266 or wireless intelligent equipment 238 to control/command all of these using the CT/MD 202 in conjunction with Server C 214.

The commands/instructions are keypad, textual, sound or voice actuated and can be in one or more languages, such as Chinese, English or any other language supported.

Figures 3, 4:
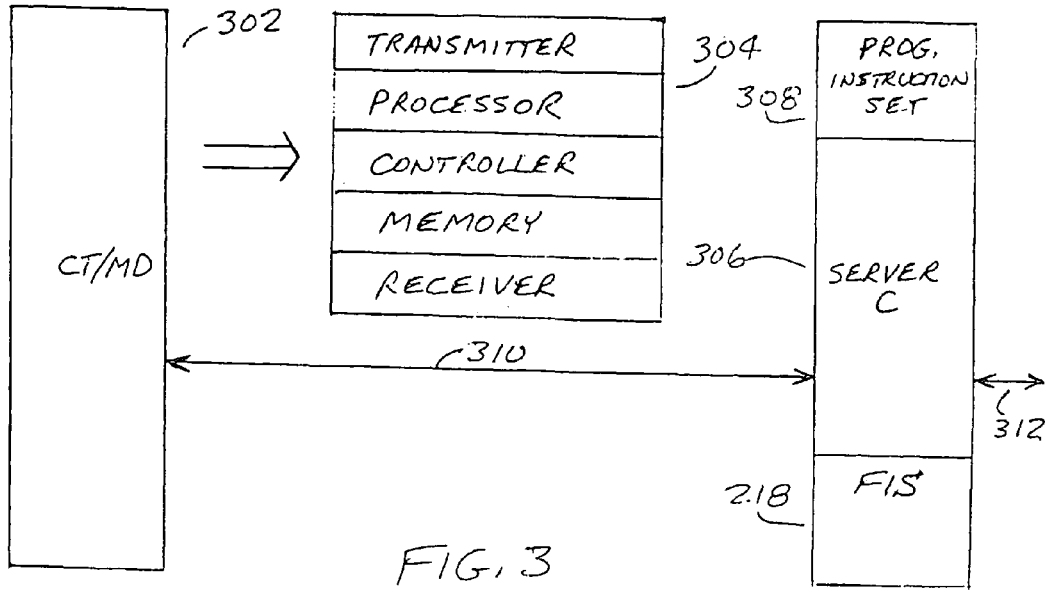
FIG. 3 is an embodiment showing how a server is incorporated in the system.
FIG. 4 is an embodiment showing how modes and environments may be mapped.

FIG. 3 illustrates how a CT/MD 302 cooperates with a Server C 306. In FIG. 3, internal structure 304 of CT/MD 302 shows how CT/MD 302 is organized for operation with Server C 306. Server C 306 also has instructions 308 as well as FIS 218 for allowing operation with CT/MD 302, and input/output paths 310 and 312 from Server C 306 for interfacing or transmitting and receiving from and to external devices such as intelligent appliances 266 or intelligent equipment 238.

FIG. 4 illustrates how the communication and control system 200 of the present invention is mapped 402, 404 to various modes. In FIG. 4 only primary, secondary and tertiary modes are shown in table 402 and in table 404, but more modes can be easily accommodated by simple extensions of the entries shown. In connection with FIG. 4:

i) The CT 202 wishes to be in the primary mode of the local wireless office loop 230 whereas it is currently in the public carrier wireless loop 200. A request, menu or macro command 284 is chosen by the CT 202 and a request for reconfiguration is sent to the Server C 214 via the wireless Internet 204 using frequency Fp and utilizing a public carrier 208.

ii) The Server C 214 looks up the functional instruction set 218 and maps the instruction set for transmission to the CT 202. The CT 202 processes the instruction set via the controller and processor electronics located within the CT 202 and loads the new FSI 218 into the memory block of the CT 202, and tunes/sets the frequencies within the T/R blocks to primary frequency Fp and secondary frequency Fl. Now the CT 202 is converted to the primary local office mode 230.

iii) The CT 202 is now operating in the local office 230 loop and can control/communicate with various units, appliances and equipment 238 within the loop working in tandem with the local wireless network box 232. Similar examples can be shown for home wireless network box 262.

iv) In the present invention Transmit and Receive frequencies may be tuned to one or more primary values and one or more subsidiary values.

v) The functional instruction sets 218 may be downloaded/uploaded from/to the central server C 214 for optimal performance in a given domain and may be downloaded/uploaded into the memory of the CT/MD 202.

vi) The secondary or subsidiary modes are active to instantly spring into action/service as needed without losing the full feature functionality. Thus the device 202 instantly becomes a cell phone in the public carrier network 210 upon receiving a signal even when it is operating in the local wireless network 208 loop.

vii) Server C 214 may keep watchdog functions alive when the CT 202 is in a different mode or is inactive to instantly deliver all the content that might have been sent in the meantime as though the CT 202 was in the public carrier 210 domain.

viii) Controller electronics within the CT/MD 202 work in tandem with Server C 214 to deliver the functionality and maintain the ability to switch modes and keep track of modes.

ix) The processor electronics within the CT/MD 202 along with the processing and software capability of Server C 214 is able to continually deliver all necessary processing horsepower and capability to device CT/MD 202.

x) The memory electronics within the CT/MD 202 keeps/caches instructions and other data in conjunction with Server C 214 to quickly execute tasks and efficiently update changes in models.

xi) The Transmitter and Receiver are independently tunable to one or more frequencies for operation in different environments based on the instructions of internal controller electronics and that of Server C 214.

Figure 5:
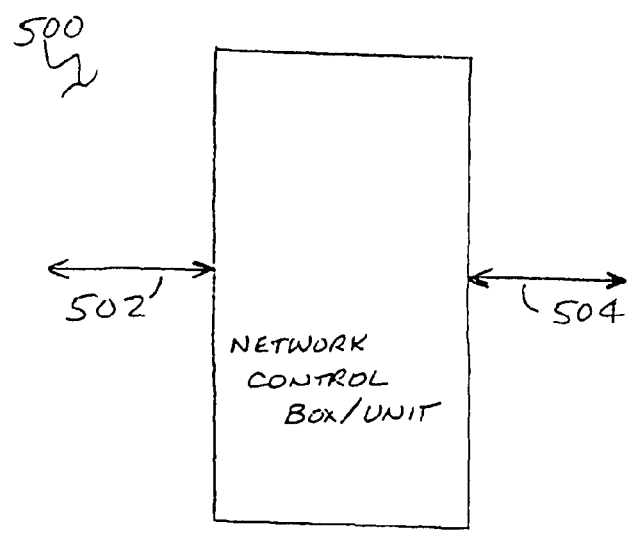
FIG. 5 is an embodiment of a network control box.

FIG. 5 is an embodiment of the wireless communication and control system of the present invention with more detail of the network control box 500. Server C 214 is located at home 260, office 230 or other location 200 and has one or more assigned channels of inputs and outputs 502. Example: standard telephone line, cable, or standard public carrier cellular telephone frequency.

Other input and output channels 504 are each dynamically tunable, such as to specific power levels, channel bandwidths and frequencies of operation, for maintaining reliability and integrity and to receive/transmit wireless communications from/to one or more services.

Inputs and outputs 502, 504 are multiplexed for optimal assignment by the controller, Server C 214, based on requests and utilization/demand.

The network box 500 may have one or more static IP addresses and one or more dynamic IP addresses may be assigned by the network box 500 to a different MD/SD 202 in the wireless network 200, 230, 260.

The functional instruction sets 218 for configuration to different modes is maintained on a Central Server C 214 located on the Internet 206. The Server C 214 works in tandem with the controllers located within the CT/MD 202 or within the local or home wireless network switch/box 500 to dynamically configure the network switch 500 and the CT/MD 202. Both the CT/MD 202 and the wireless network control box 500 are dynamically configurable working in tandem with Server C 214 located on the Internet 206.

The present invention deals with the issues of functionality using a wired or wireless network box and the dynamically configurable device utilizing the power of the Internet. In accordance with the invention, a central server C 214 (one or more) works alone or in tandem with other local and Internet servers and local or other Internet based network boxes. This will be illustrated using a cellular telephone but is fully extendable to all mobile devices.

Cellular telephone or mobile device CT/MD 202 working in the domain 200, 230, 260 highlighted in FIG. 2A, FIG. 2B, and FIG. 2C. Primary mode is through public carrier 204.

CT 202 initiates wireless IP connection to the Internet 206 via the public carrier 204 at a set frequency, Fp 208, designated by the carrier and tuned for T/R for that particular carrier's FCC approved frequency band of operation. The carrier senses the T/R and makes either wired or wireless connections to the Internet 206 via the Internet backbone connection 212 to a desired Server C 214 or any web site 216 as defined by the CT/MD's URL request. CT/MD 202 completes the transaction as defined by this loop 200, 230, 260.

When CT/MD 202 wishes to use the services of Server C 214, the Server C 214 works to efficiently deliver the content or perform functions requested by CT/MD 202.

CT/MD 202 utilizes the profiles and other user specific information 218 stored on the Server C 214.

Server C 214 is used to keep the various "functional instruction set" and software 218 for use by CT/MD 202. This FIS and software 218 resident on Server C 214 will serve as the primary repository/exchange to deliver various mode reconfiguration requests to the CT/MD 202. For example, the CT/MD 202 may send a request to the Server C 214 to be configured as a cell phone because it is not in the home environment 260. In this mode the CT/MD 202 may still receive inputs/outputs from to the local office loop network box 232 or the home network box 262, but this is via the public carrier channel 208.

The ability of a CT/MD 202 to sense and switch from one mode to the other may be linked to a Global Positioning System (GPS) 220 that determines the exact location of the CT/MD 202. The CT/MD 202 may sense (or the appropriate network box 232, 262 at the office or home may sense) the location of the network box 232, 262 or the net to bring the CT/MD 202 into any local or carrier loop.

The CT/MD 202 in conjunction with the Server C 214 decides the preferred mode to be in. There may be a primary mode and several secondary modes or a hierarchy of modes. The primary mode may be local office 232 and then the public carrier 204 loop, followed by the home 262 loop. This switching may be automatic or per specific functional instruction set 218 and preferences stored on the Server C 214 or in the CT/MD 202 itself.

FIG. 2B is an embodiment of a Local Office 230 Loop. In FIG. 2C a local wireless office IP network 232 communicates with a CT/MD 202 and with Office Servers 234. Office Servers 234 then connect to the Internet 206 and from there to Server C 214. Server C 214 then connects to websites and servers on the Internet 206 as required.

The CT/MD 202 functions in the local office 230 loop under the supervision of a local office wireless network switch or box 232.

The local office 230, such as a local network box 232, can operate at the same or different frequencies for T/R. It is preferable for the local network box 232 and loop 230 to be at different frequencies geared towards a smaller area of influence so as not to interfere with a public carrier frequency domain 210. This also allows the local network box 232 to be under the control of the local office 230—such as an office building or office campus.

The local wireless network switch or box 232 operates at one or more frequencies with one or more channels devoted to public carrier frequencies 210 for T/R and one or more channels for T/R optimized for localized use 236 in the campus or office building.

The CT/MD 202, when in the local office 230 loop, switches itself for optimal performance in the local office 230 loop by downloading/uploading FIS 218 instructions and/or protocols in tandem with Server C 214.

In one embodiment the CT/MD 202 serves as a cordless phone in the local environment for interoffice phone calls or local area network 236 access working in tandem with local network box 232.

In a similar fashion as described above, the CT/MD 202 also serves as a remote controller for controlling intelligent office appliances 238 such as copiers and faxes.

Figure 6:
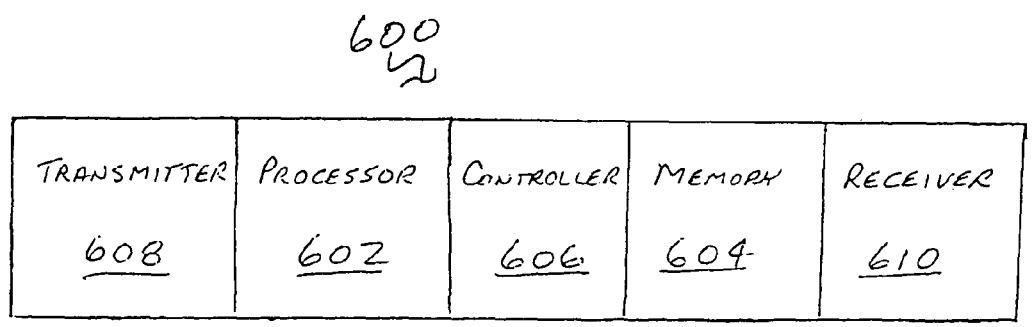
FIG. 6 is an embodiment illustrating the various parts of a server.

FIG. 6 is an embodiment of the communication and control system 600 of the present invention. In FIG. 6, CT/MD 202 is being used in the home loop 260 and illustrates how a processor 602 and memory 604 form a controller 606 with a transmitter 608 and receiver 610 to provide the Server C 214 of the present invention.

The CT/MD 202 may function in the local home 260 loop under the supervisory control of a home network box 500 able to T/R at the specific home frequency band.

The home wireless network box 500 operates at the same or different frequencies of T/R as a public carrier. It is desirable to have different frequencies of T/R optimized for home area wireless networks.

The local home wireless network box operates at one or more public carrier frequencies and one or more local home wireless network box frequencies.

The CT/MD 202, when in the home wireless network 260 mode, switches itself for this task for optimal performance by downloading/uploading FIS 218 (function instruction software) and/or protocols in tandem with Server C 214.

The CT/MD serves as a cordless phone (connected or hooked into a landed telephone line, as an example) in the home wireless network loop because it is now configured to be so by the FIS. Thus one CT/MD serves many purposes such as replacing many telephone hand sets (one for the home, one for the office, and one for the car). Paging from one phone to the other in the wireless home network may be done very easily. The CT/MD doubles as a regular telephone hand set.

In a similar fashion as described above, the CT/MD may also serve as a remote controller for various IP based intelligent wireless or wired home appliances. The TV may be controlled using the cell phone if the TV set is capable of receiving wireless commands/output. The electronic garage door opener may be a macro command 284 downloaded from the Central Server C.

FIG. 7 is an embodiment of the communication and control system 700 of the present invention with tables demonstrating parameter setting for a CT/MD 202 or a Server C 214, such as for different configurations and environments. In FIG. 7, CT/MD 202 supports two frequencies in this embodiment, and both are dynamically changed in real time, including power output and channel bandwidth as well as frequency, in this embodiment. Table 702 represents the initial operating state, and table 704 represents the new operating state assumed by the CT/MD 202 or the Server C 214.

Any set of "macro commands" and or detailed FIS 218 may be written for specific wireless intelligent appliances 266 or equipment 238 to control or command all of these using the CT/MD 202 in conjunction with Server C 214. The control of the intelligent appliances 266 or intelligent equipment 238 is done in real time with dynamic reallocation of the environment as shown in tables 702 and 704.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the present invention and its practical application, to thereby enable others skilled in the art to best utilize the present invention and various embodiments, with various modifications, as are suited to the particular use contemplated. It is intended that the scope of the invention be defined by the Claims appended hereto and their equivalents.

What is claimed is:

1. A method for a mobile device using a server, the method comprising:
    enabling the server to be in communication with the mobile device;
    accepting an upload of software to a server configured for use by a plurality of mobile devices and further configured to provide a plurality of different software functions to mobile devices;
    configuring the mobile device to use the server to access a configuration setting;
wherein the mobile device includes one or more functions of a cellular telephone;
    and wherein the mobile device is configured to transmit and receive at a plurality of frequencies; wherein the mobile device is dynamically software reconfigurable for the various environments wherein the mobile device is enabled to obtain a signal to noise ratio; wherein the mobile device is enabled to be tuned to transmit and/or receive frequencies including one or more primary values and subsidiary values;
    wherein the mobile device transmitter and receiver are independently tunable to one or more frequencies for operation in different environments based on the instructions of internal controller electronics and/or that of the server wherein the mobile device dynamically changes its frequency for communication;
    wherein the mobile device uses a power level for an operating environment; and
    wherein both power output and channel bandwidth as are dynamically changed in real time.

2. A system comprising:
    a remote server configured to store wireless device software for a plurality of different functions or applications for use by a plurality of wireless devices,
    wherein the remote server stores in memory software for a wireless device, wherein the remote server sends to the wireless device software, wherein the remote server stores profiles of user specific information,
    wherein the wireless device is enabled for voice and data communication,
    wherein the wireless device includes one or more functions of a cellular telephone, PDA, handheld computer, or multifunction communication device, or combinations thereof, wherein the wireless device is configured to use Internet protocol;
    wherein the software controls a plurality of the hardware components on the wireless device;
    wherein the wireless device is configured to transmit and receive at a plurality of frequencies: wherein the wireless device is enabled to be tuned to transmit and/or receive frequencies including one or more primary values and subsidiary values;
    wherein the wireless device transmitter and receiver are independently tunable to one or more frequencies for operation in different environments based on the instructions of internal controller electronics and/or that of the server wherein the wireless device dynamically changes its frequency for communication; wherein the wireless device uses a power level for an operating environment; and wherein both power output and channel bandwidth as are dynamically changed in real time.

3. The system of claim 2, wherein the profiles contain information for both a user and the wireless device.

4. A wireless electronic device or mobile device, the device comprising:
    a processor;
    a memory;
    a unit for wireless communication;
    wherein the device is capable of voice and data communication,
    wherein the device connects to a server,
    wherein the device includes one or more functions of a cellular telephone, PDA, handheld computer, or multifunction communication device, or combinations thereof,
    wherein the software is associated with a user and the device stored in a profile,
        wherein the server is configured to store software for a plurality of wireless devices and for a plurality of applications for the plurality of wireless devices,
        and wherein the device is enabled to communicate on a plurality of frequencies;
        wherein the device is enabled for voice and data communication;
        and wherein the device is enabled for voice communication using cellular and wherein the device is enabled for wireless voice communication using a local area network;
        wherein the device dynamically software reconfigurable for the various environments;
        wherein the device is enabled to be tuned to transmit and/or receive frequencies including one or more primary values and subsidiary values;
        wherein the device dynamically changes its frequency for communication;
    wherein the device uses a power level for an operating environment;
        and wherein both power output and channel bandwidth as are dynamically changed in real time.

5. The device of claim 3, wherein the device downloads an application to function as a remote control for one or more devices including a television.

6. A system comprising:
a wireless device configured to receive a non-transitory computer readable medium from a server located at a remote location separate from the wireless device, the non-transitory computer readable medium for a wireless device comprising:
an application software to be run by a processor on the wireless device, wherein the wireless device is in further communication with a television configured to receive wireless commands over a network, wherein the wireless device is configured to send a request to the television, wherein the request comprises a control function for the television, wherein the wireless device is configured to send said commands using a local home IP network, and wherein the communication between the television and the wireless device is over a IP based network as part of a home network; and
wherein the wireless device obtains from the server a plurality of software for the control of a plurality of home appliances; and wherein commands to the control the one or more appliances are voice actuated based on input to the wireless device; and
wherein the device operates using a plurality of frequencies; and wherein the wireless device is enabled to be tuned to transmit and/or receive frequencies including one or more primary values and subsidiary values; wherein the wireless device dynamically changes its frequency for communication; and wherein the wireless device uses a various power level for an operating environment.

7. The system of claim 6, wherein the wireless device is configured to communicate directly to the television.

8. The system of claim 6, wherein the wireless device is configured to communicate a set of commands to a server, the server configured to communicate said commands to the television.

9. The system of claim 6, wherein the wireless device is configured to communicate a set of commands over a network to a network switch box over a wireless local area network, and wherein the network switch box is configured to transmit said commands to a television.

10. The system of claim 1, wherein the server provides software for the configuration of the mobile or wireless device as an IP telephone.

11. The system of claim 1, wherein the download of the software is based on a hierarchy of network paths.

12. The system of claim 1, wherein the device is configured for location sensing through use of both GPS and the location of network box and reconfigures one or more parameters based on the location.

13. The system of claim 1, wherein the mobile device is configured to download an application for controlling a garage door opener.

14. The system of claim 1, wherein the mobile device is configured to function as an internet protocol IP phone.

15. The system of claim 1, wherein the server is colocated with a wireless carrier.

16. The system of claim 1, further in communication with a network box is for use in a home environment.

17. The system of claim 1, wherein the server is colocated with an office network.

18. The system of claim 1, wherein the mobile device serves as a remote controller for controlling intelligent office appliances.

19. The system of claim 2, wherein responsive to a request from the one or more wireless device to a website or URL associated with a website server or a network environment, the one or more wireless device receives an indicator of a software application to be downloaded from the remote server.

20. The system of claim 19, wherein the server delivers content not when device is in a carrier domain.

21. The system of claim 2, wherein the device determines a more precise location using both GPS location and a network box location.

22. The system of claim 2, wherein the device is configured to download an application for controlling a garage door opener.

23. The system of claim 2, wherein the device is configured to function as an internet protocol IP phone.

24. The system of claim 2, wherein the server is collocated with a wireless carrier.

25. The system of claim 2, further in communication with a network box for use in a home.

26. The system of claim 2, wherein the server is colocated with an office network.

27. The system of claim 2, wherein the wireless device uses a command to a control a copier.

28. The system of claim 4, wherein the server delivers content not when device is in a carrier domain.

29. The system of claim 4, wherein the server provides software for the configuration of the mobile or wireless device as an IP (Internet Protocol) telephone.

30. The system of claim 4, wherein the download of the application is based on a hierarchy of network paths.

31. The system of claim 4, wherein the download from the server to the device is in a watchdog state and inactive.

32. The system of claim 4, wherein the download of the software is based on a request to a URL associated with a server.

33. The system of claim 4, wherein a home server functions to controls a plurality of home intelligent appliances.

34. The system of claim 4, wherein the device communicates to a home server commands including starting and stopping an operation at a desired time, and wherein the home server controls one or more home intelligent appliances.

* * * * *